April 16, 1935.    M. M. M. BILLON ET AL    1,997,571
ENGINE STARTER
Filed May 1, 1929    6 Sheets-Sheet 1

Marcel Marie Maurice Billon
Georges Louis Frederic Boname
INVENTORS
By
their Attorney.

April 16, 1935. M. M. M. BILLON ET AL 1,997,571
ENGINE STARTER
Filed May 1, 1929   6 Sheets-Sheet 2

Marcel Marie Maurice Billon
Georges Louis Frederic Boname
INVENTORS

April 16, 1935.  M. M. M. BILLON ET AL  1,997,571
ENGINE STARTER
Filed May 1, 1929  6 Sheets-Sheet 3

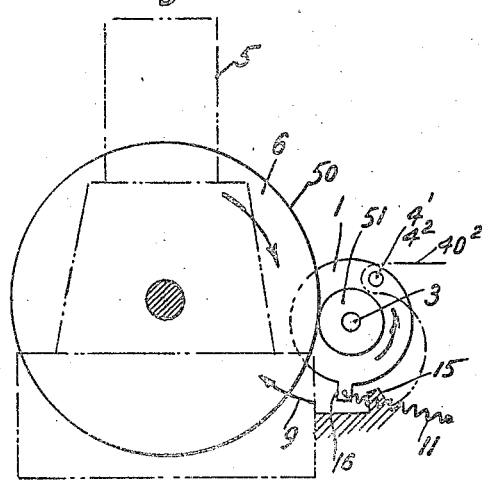
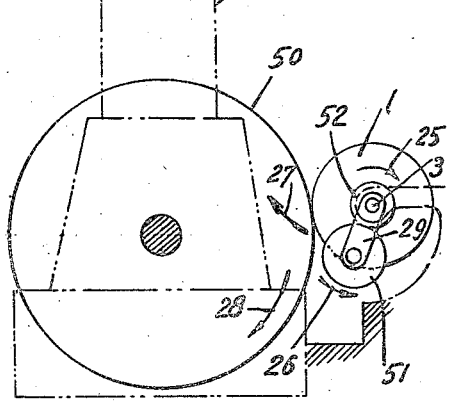
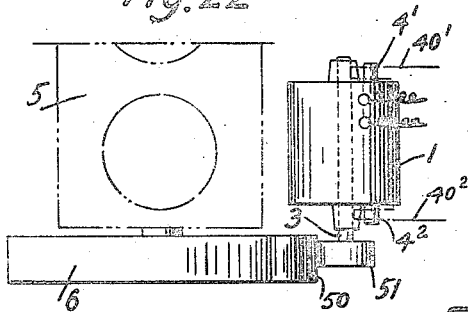
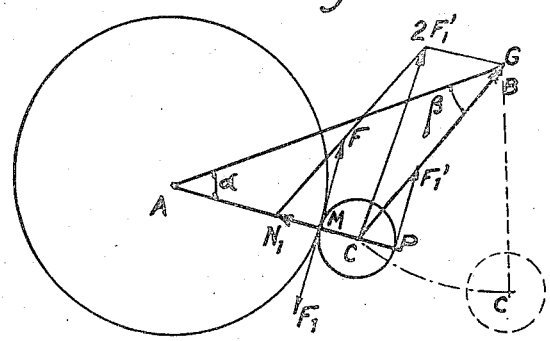

Patented Apr. 16, 1935

1,997,571

UNITED STATES PATENT OFFICE 1,997,571

ENGINE STARTER

Marcel Marie Maurice Billon, Besancon, and Georges Louis Frederic Boname, Paris, France, assignors, by mesne assignments, to United States Holding Corporation, a corporation of Delaware Application May 1, 1929, Serial No. 359,629

9 Claims. (Cl. 74—8)

The present invention has for its object to obviate the drawbacks inherent in the usual devices employed for the starting of heat engines such as internal combustion engines, gas engines, gasoline engines, and others, such drawbacks consisting in a jamming action which prevents the functioning, wear of the teeth when the engine is started by pinions, noise occasioned by damaged gear teeth, and other causes.

The present invention has further for its object the entire elimination of gearing in the parts connecting the starting motor to the heat engine.

The aforesaid objects are attained by the features specified in the following description and chiefly in the claims appended hereto.

Various embodiments of the invention are shown by way of example in Figures 1 to 21 of the accompanying drawings.

Figure 6:
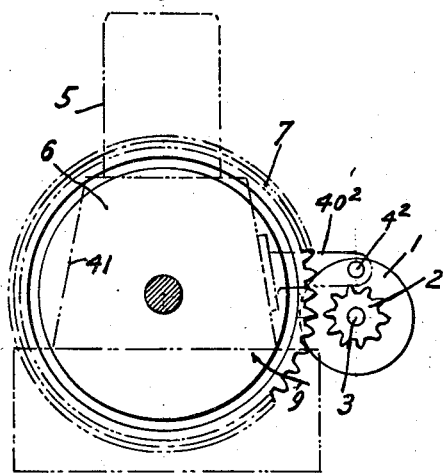
Figure 7:
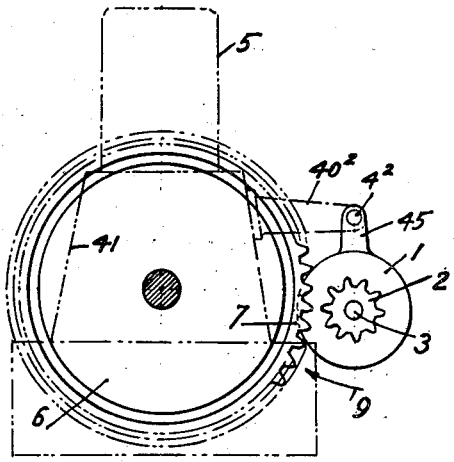

Figs. 6 and 7 relate to arrangements for the pivoting of the starter casing.

Figure 8:
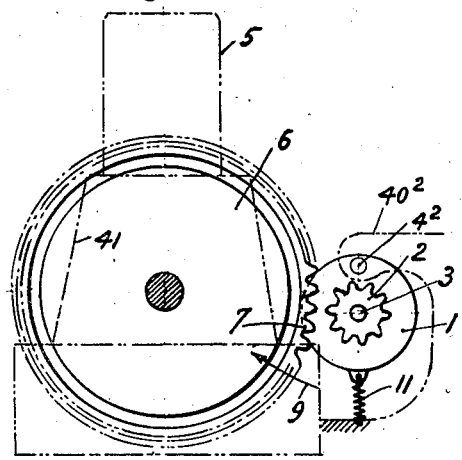

Fig. 8 is an elevational view of a reaction device.

Figure 9:
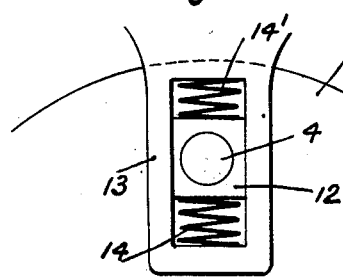

Fig. 9 is a sectional view of an elastic suspension device for the starting motor.

Figure 10:
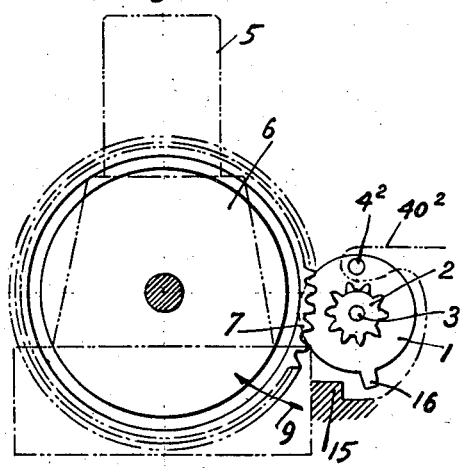
Figure 11:
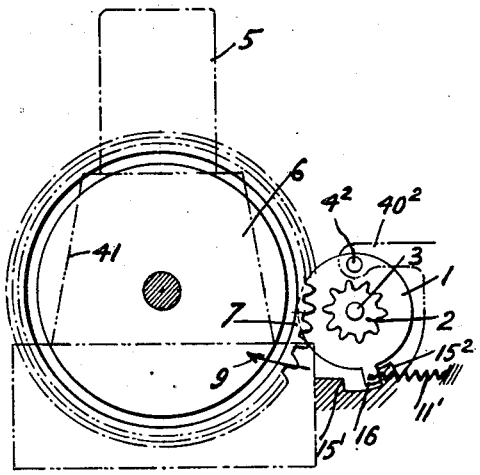
Figure 12:
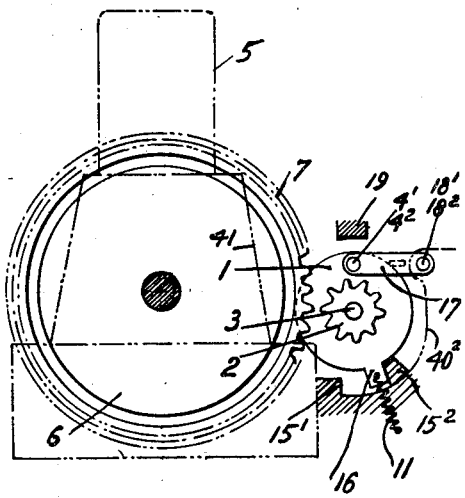

Figs. 10, 11 and 12 are elevational views of means for stopping the said starting motor at the end of its movement.

Figure 13:
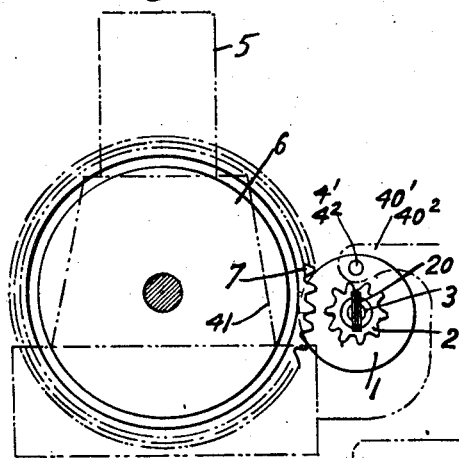

Fig. 13 relates to an elastic actuating device.

Figure 14:
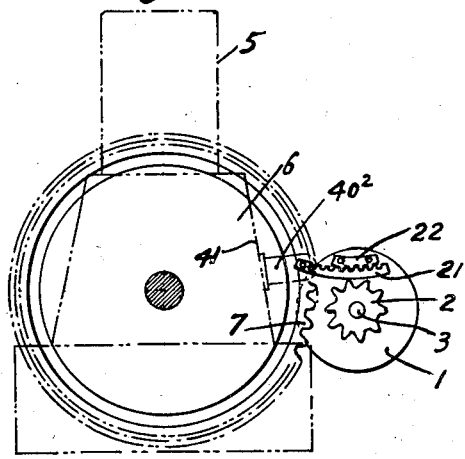
Figure 15:
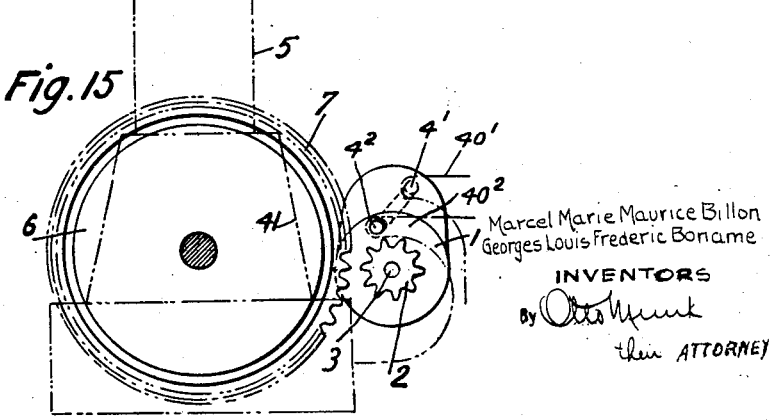

Figs. 14 and 15 are modified forms of the device for pivoting the motor casing.

Figure 16:
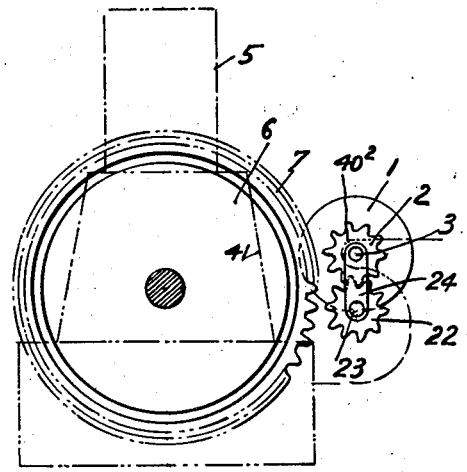
Figure 17:
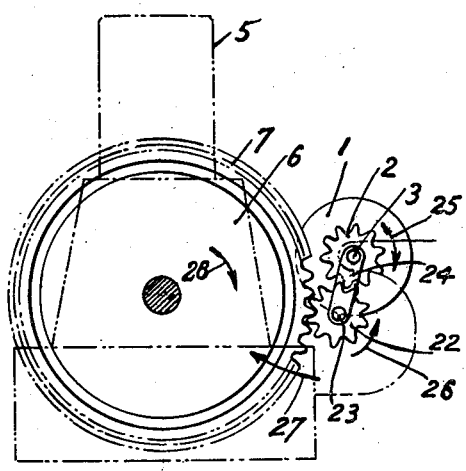

Figs. 16 and 17 show respectively in the inoperative and operative positions, a modified apparatus provided with an oscillating pinion.

Figure 18:
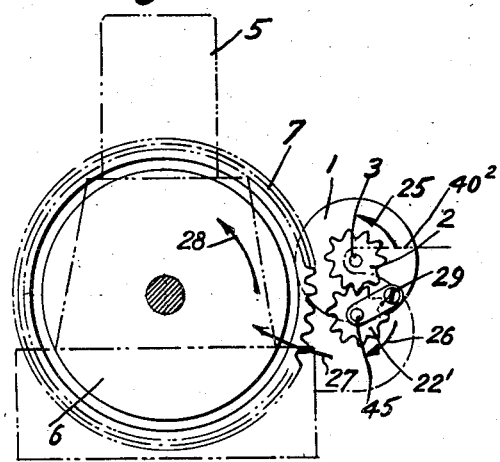

Fig. 18 shows a modification of the apparatus shown in Figs. 16 and 17.

Figure 19:
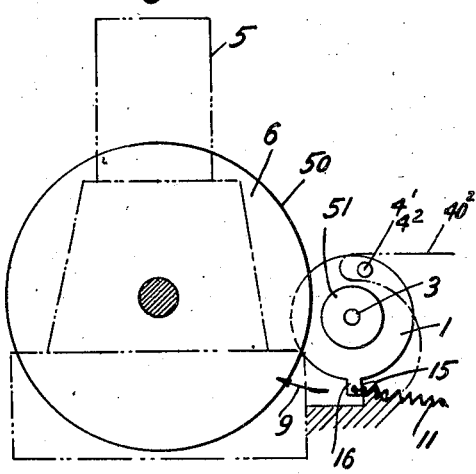

Figs. 19 and 20 show another form of starting device in which the gearing is eliminated, the device being firstly in the inoperative position and secondly in the engine-starting position.

Figure 21:
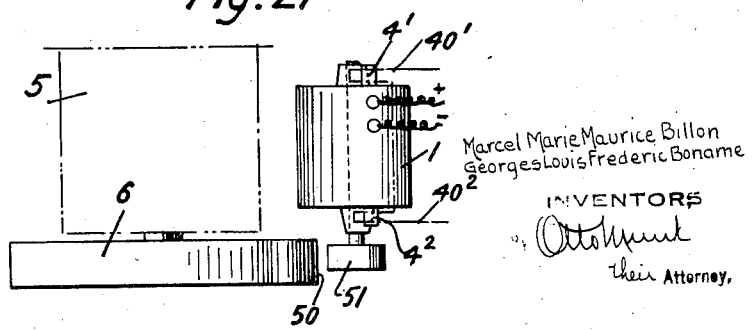

Figs. 21 and 22 are two plan views of the device shown in Figs. 19 and 20, the device being firstly in the inoperative position and secondly in the engine-starting position.

Fig. 23 shows the distribution of the stresses.

Fig. 24 shows a modified form of the starting device shown in Figs. 19 and 20.

Figure 25:
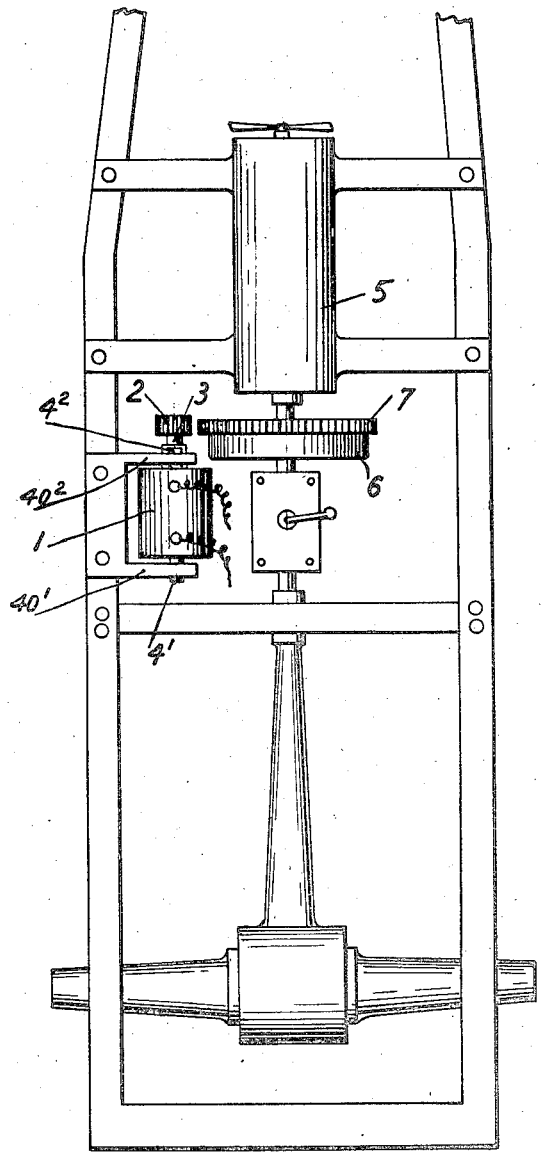

Fig. 25 is a general view showing a starting device mounted upon a vehicle frame.

Figure 1:
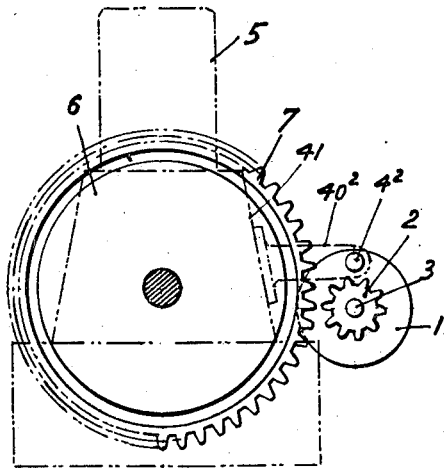
Figs. 1 and 2 are respectively an elevational and a plan view of an apparatus according to the invention, in the inoperative position.
Figure 2:
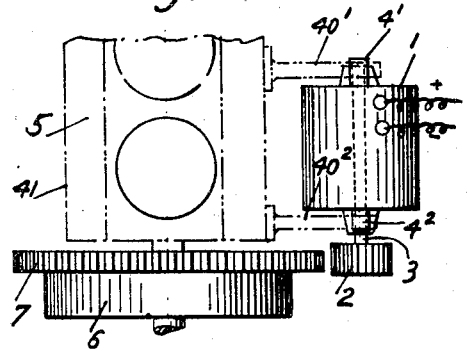

Figures 1 and 2 show the starting motor $1$, such as a motor of the electric, compressed air, hydraulic or other type, which comprises a pinion $2$ mounted on the rotor shaft $3$. The motor casing is provided with two trunnions $4^1$ and $4^2$ rotatable in respective bearings $40^1$ and $40^2$ which are mounted on the casing $41$ of the internal combustion or other engine $5$, which is provided with a flywheel $6$ carrying a toothed ring $7$.

Figure 3:
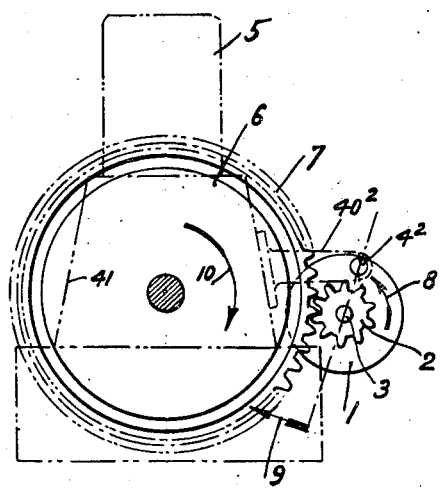
Figs. 3 and 4 are respectively an elevational and a plan view of an apparatus in the operative position.
Figure 4:
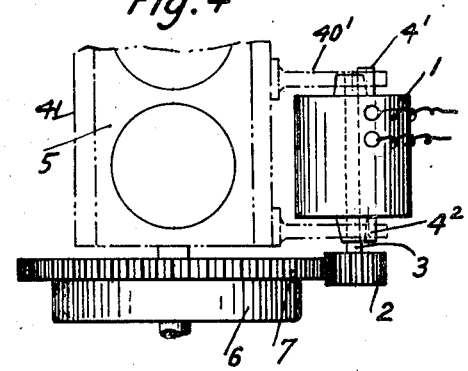

In the inoperative position of the starting motor $1$, as shown in Figures 1 and 2, the pinion $2$ is at a certain distance from the toothed ring $7$. The arrangement is such that the said pinion may be engaged with the ring $7$ by pivoting the starting motor $1$ upon its trunnions $4^1$ $4^2$, as shown in Figs. 3 and 4.

The operation of the said apparatus is as follows. The starting motor comprises in all cases a rotor and a stator. The said stator $1$ is not however stationary as usual, but can be pivoted on its said trunnions $4^1$ $4^2$, so that when the rotor and the said pinion $2$ are set in motion, rotating in the direction indicated by the arrow $8$, the stator will offer a reaction which is not opposed, as usual, by the reaction of the ground, and this produces in the present case an abrupt pivoting motion of the body of the starting motor $1$ in the direction of the arrow $9$, thus bringing the teeth of the pinion $2$ into the spaces between the teeth of the ring $7$, and hence driving the flywheel $6$ carrying said ring, in the direction of the arrow $10$.

In this manner the said flywheel which is keyed to the movable parts of the engine $5$ will drive these movable parts.

As long as the pinion $2$ meets with a resistance from the teeth of the ring $7$ acting against its rotation, the reaction of the stator will maintain the starting motor $1$ in the inclined position and will thus hold the teeth in their engagement.

When the starting has been effected, the direction of this resistance changes. At this time the starting motor returns by its own weight to the normal position (Fig. 1). This return movement is facilitated by the impulse given by the flywheel $6$ to the pinion $2$, for the flywheel now rotates at a high speed, in the direction indicated by the arrow $10$, under the action of the engine $5$ which is now running. On the other hand, at this time the driver who observes that the engine is running, ceases to press down the accelerator pedal, thus cutting off the supply to the starting motor, which now returns to the position shown in Figures 1 and 2.

Figure 5:
Fig. 5 shows the form of the gear teeth.

The insertion of the teeth of the pinion 2 into the spaces between the teeth of the ring 7 is facilitated by the use of teeth whose form is shown in Figure 5, and such teeth may have inwardly curved sides 42¹ 42² connected together by a rounded part 43.

The trunnions 4¹ 4² may be so disposed as to be within the limits of the casing (Fig. 6) or as shown in Fig. 7 they may be outside of the said casing, which latter then comprises an extension 45 for suspension purposes.

Fig. 8 shows a construction in which the returning action of gravity is replaced or completed by a reaction spring 11.

Fig. 9 shows on a larger scale suitable means affording an easy elastic action in the engagement of the pinion 2 and the ring 7, and herein the trunnion 4 is mounted in a square block 12 slidable in a stationary guide 13 and held in a mean position by two springs 14—14¹ acting in contrary directions upon said block. In this manner, the action of the starting device is rendered more elastic, and the teeth are more readily engaged.

Fig. 10 shows an abutment device used in the apparatus, in the case in which the teeth of the pinion are not to penetrate clear to the bottom of the spaces between the teeth of the ring. The abutment 15 thus serves to stop the pivoting motion of the starting motor 1 on the trunnions 4¹ 4², and the casing of this motor makes contact, by its arm 16, with said abutment 15 at the end of the pivoting motion in the direction of the arrow 9, so that the teeth of the pinion 2 will have the proper position in the recesses of the toothed ring 7.

Fig. 11 shows a device having two abutments 15¹ 15², and the reaction spring 11¹ now acts contrary to the arrow.

Fig. 12 shows another arrangement providing for a double pivoting movement of the starting motor. The pivoting support 17 carrying the trunnions 4¹ 4² can also pivot upon trunnions 18¹ 18². The double abutment 15¹ 15² at the lower part serves to limit the motion of the arm 16 of the casing and hence the motion of the starting motor 1 toward the engine as the latter is to be started up, and away from the engine after it is started, the latter motion being aided by the reaction spring 11. An abutment 19 cooperating with the said casing of the starting motor 1 serves to limit the upward displacements of said motor.

Fig. 13 shows a device in which the elasticity is obtained on the pinion 2 itself. The said pinion may turn upon the shaft 3 and is actuated by said shaft by means of a set of spring strips 20 which allow a slight angular motion of the pinion 2 with reference to the shaft 3. Any other elastic arrangement such as a spiral or volute spring, or other, may be employed to produce the same result.

The invention also covers various other methods for the pivoting of starter casing 1, and for instance the trunnions 4¹ 4² (Figs. 1 to 12) may be replaced by a rack 21 (Fig. 14) secured to the casing of the heat engine, cooperating with a pinion (or part of a pinion) 22 mounted on the starter, whereby the starter can pivot upon the said rack.

On the other hand, it is not necessary that the trunnions 4¹ 4², or more generally, the pivoting axis of the starter, shall be parallel to the axis of the rotor, and the pivoting axis may be inclined from the rotor axis; it is observed in Fig. 15 that the center line of the trunnions 4¹ 4² makes a certain angle with the center line of the shaft 3 of the starter 1.

According to the present invention, it is not essential that the starting motor itself shall have the pivoting motion, and the apparatus may comprise an intermediate pinion 22 (Fig. 16) engaging the pinion 2. The shaft 23 of the intermediate pinion 22 is pivotally mounted in a lever 24 adapted to turn about the shaft 3 of the starting motor (Fig. 17).

When the circuit is closed, the pinion 2 starts to move according to 25, thus driving the intermediate pinion 22 and pivoting the lever 24 in the direction indicated by the arrow 27 (Fig. 17) until the said pinion 22 is engaged with the toothed ring 7. At this time the pinion 22 is driven by the pinion 2 and it drives the toothed ring 7. Hence in the case of Figures 16 and 17 the motor casing is not pivoted about, but only the lever 24 which brings the intermediate pinion 22 into engagement with the toothed ring 7.

The elastic device shown in Figure 13 may be used with the pinion 22, as well as the abutment devices.

The pivoting axis may be the axis of the motor itself, and herein (Fig. 18) the apparatus comprises an auxiliary pinion 22¹ engaging the pinion 2 and pivoted at 45 to the end of a lever 29 which forms a cross bridge and supports the pinion 22¹.

This device operates in the same manner as the aforesaid starting devices. When the circuit of the starting motor 1 is closed, the electromagnetic reaction between its field and armature causes the stator to rotate on its shaft 3 in the direction indicated by the arrow 27, thus bringing the intermediate pinion 22¹ into engagement with the outer ring 7. On the other hand, the said intermediate pinion 22¹ turns upon its axis 45 by the action of the starting pinion 2 and thus rotates the toothed ring 7 whereby the engine will be started.

Immediately after the starting takes place, the motor which rotates at a much greater speed in the direction indicated by the arrow 28 will drive back the pinion 22¹ in the contrary direction to that indicated by the arrow 27, and it thus brings the starter 1 into the position shown in Figure 18. After this starting takes place, the driver also releases the pedal, thus breaking the circuit of the starter.

Figs. 19 to 23 relate to an advantageous embodiment of the invention in which the gearing is replaced by rollers, and the toothed ring of the heat engine is replaced by a smooth flywheel. The apparatus has the following construction.

The starter 1 consists as before of an electric motor which is suspended upon its trunnions 4¹ 4²; upon its casing is an arm 16 cooperating with a stationary stop 15 which limits the oscillation of the casing in the contrary direction to that indicated by the arrow 9. On the shaft 3 of the starter 1 is mounted a smooth driving roller 51. On the other hand, the internal combustion engine 5 carries a flywheel 6 upon which is disposed a smooth driving ring 50.

The said apparatus operates as follows. When the driver presses down his pedal and thus closes the circuit of the starting motor 1, there is produced an electromagnet reaction between the field and armature whereby the starter casing will turn in the direction indicated by the arrow 9 upon its trunions $4^1$ and $4^2$, so that the starter will move from the position shown in Figures 19 and 21 to the position shown in Figures 20 and 22, and the roller 51 is thus brought into contact with the smooth ring 50; the roller will tend to rotate the ring by adhesion, and its pressure upon said flywheel will increase in proportion to the couple transmitted.

In the said apparatus the construction of the several parts of the starting device is such that the products of the coefficient of adhesion between the roller 51 and the flywheel 50, by the pressure between the flywheel 50 and the roller 51, will exceed the couple at the periphery of the said roller. In these conditions, no slipping can take place between the said roller and the flywheel, so that the latter will be driven.

The diagrammatic Figure 23 shows the operation of the said starter, also indicating the distribution of the stresses; A is the axis of the flywheel of the heat engine; B the axis of oscillation of the starter, C the axis of the driving roller. As soon as the roller 51 makes contact with the ring 50 there is produced a jamming reaction which tends to press the said roller very strongly against the ring.

Since the starting couple is represented by the forces $F_1$ $F_1^1$ (in which $F_1 = -F_1^1$) on the arm of the lever MP, there will be equilibrium at M between $F_1$ and the resistance F offered by the ring or flywheel of the heat engine. There remains the force $F_1^1$ at P, for which may be substituted the force $2F_1^1$ at C, and this can be decomposed into the force G, represented by the line CB, which is balanced by the reaction of the shaft B, and $N_1$, the normal force applying the roller 51 to the ring 50.

The engine can thus be started by a smooth roller and flywheel, provided the force of friction $f \times N_1$ is always greater than the driving force $F_1$. This depends solely upon the angles $\alpha$ and $\beta$, and the functioning is more reliable as these angles are smaller, since the force $N_1$ is thus increased. Furthermore, the force of adhesion increases directly with the couple transmitted.

This arrangement of roller and flywheel obviates all the disadvantages due to the use of gearing, such as wear of the teeth, great cost, jamming of the movable parts, disagreeable noise when starting, and others.

In designing the machine, it is necessary to take account of the force which tends to bring the starter 1 to its initial position, when the heat engine begins to run and the resistance of the flywheel 50 to the roller 51 diminishes; the casing now swings to the rear and the roller is thus removed from the flywheel, so that all connection between the starter and the engine is cut off. This return is furthered by the spring 11.

The starting motor 1 may have a stationary casing, and the movable roller 51 may operate between a stationary roller 52 mounted on the starter shaft and the flywheel 50 (Fig. 24) and herein the roller 51 is pivoted on the end of a lever 29 which is pivoted to the end of the shaft 3 of the starter 1.

This modification operates in the following manner. When the driver closes the circuit of the starter 1, an electromagnetic reaction is produced which causes the arm 29 to turn in the direction indicated by the arrow 27, thus bringing the roller 51 into engagement with the smooth flywheel 50. On the other hand, when the starter shaft turns in the direction indicated by the arrow 25 it draws with it the roller 52 which turns the roller 51 according to 26 upon its axle, and thus the roller 51 is jammed against the smooth rim 50 and turns it in the direction of arrow 28, as above stated.

After the engine has been set running, the smooth rim 50 which turns with the engine at high speed, drives the roller contrary to 37 and this separates the starter from the engine.

To recapitulate, the said invention provides a very simple starting device of an effective nature, while obviating all defects inherent in starters provided with gearing.

What is claimed is:

1. In combination with an engine having a rotatable shaft, a starting mechanism comprising a motor, means for freely pivotally suspending said motor with respect to said engine whereby said motor is free to swing toward said shaft under the starting torque of the motor, and means on said engine and said motor engageable with each other upon actuation of said motor to start said engine.

2. In combination with an engine having a rotatable shaft, a starting mechanism comprising a motor, means for freely pivotally suspending said motor with respect to said engine whereby said motor is free to move toward said shaft under the influence of the starting torque of the motor, a gear on said engine shaft, and a second gear driven by and movable with said motor, said second gear being moved into engaging relation with said first mentioned gear upon actuation of said motor to start said engine.

3. In combination with an internal combustion engine having a crank shaft, a starting mechanism comprising a motor, means for freely pivotally suspending said motor with respect to said engine whereby said motor is bodily movable with respect to said crank shaft by the starting torque of the motor, and gearing adapted to connect said crank shaft and motor upon said bodily movement when the motor is started.

4. In combination with an internal combustion engine having a crank shaft, a starting mechanism comprising an electric motor having a rotor and a stator, means for freely pivotally suspending said stator with respect to said engine whereby to move toward said engine under the influence of the starting torque of the motor, a gear on said engine shaft, and a second gear driven by said rotor, said second gear being movable with said stator into engaging relation with said first mentioned gear upon actuation of said motor to start said engine.

5. In combination with an internal combustion engine having a crank shaft, a starting mechanism comprising an electric motor having a stator and a rotor, a driving member on said rotor, a driven member on said crank shaft, and means for freely pivotally suspending said stator with respect to said engine, said stator depending from said supporting means and being movable thereabout upon starting of the motor to bring said driving and driven members into engaging relation.

6. In combination with an internal combustion engine having a crank shaft, a starting mechanism comprising an electric motor having a rotor and a stator, a gear on the crank shaft, a second gear on the rotor shaft, a supporting bracket on said engine, and means for freely pivotally suspending said stator on said bracket for movement under a starting torque, said stator being moved toward said crank shaft when the motor is started, whereby said gears are brought into engaging relation to start the engine.

7. In combination with an internal combustion engine having a crank shaft, a starting mechanism comprising a motor, means for freely pivotally suspending said motor with respect to said engine, said motor being bodily movable with respect to said crank shaft by the starting torque of the motor, gearing adapted to connect said crank shaft and motor upon bodily movement of the motor when the latter is started, and means for limiting the bodily movement of said motor.

8. In combination with an internal combustion engine having a crank shaft, a starting mechanism comprising a motor, means for freely pivotally suspending said motor with respect to said engine, said motor being bodily movable with respect to said crank shaft by the starting torque of the motor, gearing adapted to connect said crank shaft and motor upon bodily movement of the motor when the latter is started, and an abutment for limiting the bodily movement of said motor.

9. In combination with an internal combustion engine having a crank shaft, a starting mechanism comprising a motor, means for freely pivotally suspending said motor with respect to said engine, said motor being bodily movable with respect to said crank shaft by the starting torque of the motor, gearing adapted to connect said crank shaft and motor upon bodily movement of the motor when the latter is started, means limiting the bodily movement of said motor, and spring means for biasing the motor in one direction.

MARCEL MARIE MAURICE BILLON.
GEORGES LOUIS FREDERIC BONAME.